United States Patent Office 3,037,025
Patented May 29, 1962

3,037,025
METHOD FOR PREPARING N-ALKYL-SUBSTITUTED PIPERAZINES
Norman B. Godfrey, Austin, Tex., assignor to Jefferson Chemical Company, Inc., Houston, Tex., a corporation of Delaware
No Drawing. Filed Dec. 1, 1958, Ser. No. 777,180
6 Claims. (Cl. 260—268)

This invention relates to an improved method for preparing substituted piperazines, particularly a method for preparing N-alkyl-substituted piperazines.

Recently there has been considerable commercial interest taken in the piperazine compounds including the substituted piperazines. This has been brought about by the widening use of these compounds as pharmaceuticals and as chemical intermediates in the production of various end products. The emphasis on these materials has created a need for a more economical method for producing the desired substituted piperazines.

An effective economical method has now been discovered for preparing N-alkyl-substituted piperazines. This method has the advantage that it permits a broad choice of abundant raw materials for the reaction. This process is also advantageous in that highly active catalysts are employed permitting shorter reaction times and/or lower operating temperatures. A surprising feature of this invention is the production of a relatively high proportion of the valuable N-monosubstituted piperazines as compared to the proportion of N,N'-disubstituted piperazines.

In accordance with this invention, an N-alkyl-substituted piperazine may be prepared from a compound represented by the formula:

(1) 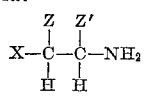

in which Z and Z' are selected from the group consisting of hydrogen and the lower alkyl radicals, and X represents a radical selected from the group consisting of OH, $NH_2$, and

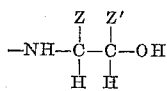

in which Z and Z' have the values noted above, and a reagent, selected from the group consisting of:

(a) An alkylamine represented by the formula (2) 

in which R is a primary or secondary alkyl radical and $n$ is 1, 2 or 3, and (b) An alkanol represented by the formula ROH in which R is a primary or secondary alkyl radical, and reacting said compound and said reagent in the presence of hydrogen and a hydrogenation catalyst.

The compounds which may be employed for this reaction defined as in Formula 1 above include ethylenediamine, monoethanolamine, N-2-aminoethylethanolamine and the corresponding C-alkyl-substituted derivatives of these compounds including propylenediamine, isopropanolamine, 1,2-butylenediamine, N-(2-hydroxypropyl) ethylenediamine and the like. Generally, the alkyl radicals in these compounds will be lower alkyl hydrocarbon radicals having from 1 to 8 carbon atoms.

Reagents which may be reacted with the above compounds include in the first class the various alkylamines, such as methylamine, ethylamine, butylamine, hexylamine, dimethylamine, trimethylamine, diethylamine and the like.

The second class of reagents includes any of the primary and secondary aliphatic alcohols, such as methanol, ethanol, propanol, isopropanol, butanol, hexanol, and the like. The alkyl hydrocarbon radicals in the reagents represented by R may have from 1 to 18 carbon atoms although lower alkyl radicals having 1 to 8 carbon atoms are preferred.

The reaction between the compounds and reagents defined above is normally conducted at an elevated temperature and at a superatmospheric pressure. Suitable temperatures may range from 150° C. to about 400° C. It has been found preferable, however, to conduct the reaction at a temperature from about 200° C. to about 300° C.

Above atmospheric pressures are generally employed to maintain a substantial portion of the reactants in the liquid phase. Suitable superatmospheric pressures may range from about 30 to about 400 atmospheres, the range from about 65 to about 225 atmospheres being preferred.

The use of hydrogen and a hydrogenation catalyst is critical for the effective formation of the N-alkyl-substituted piperazines according to this process. Accordingly, the partial pressure of the hydrogen present must amount to or constitute a substantial part of the total pressure in the reaction system. Specifically, the hydrogen should constitute at least 10 and preferably 20 to 200 atmospheres of the total pressure in the system at reaction temperatures.

A wide range of hydrogenation catalysts may be employed in this process. Particularly suitable catalysts are selected from the group consisting of the metals and oxides of copper, nickel and cobalt including mixtures thereof. Any of the foregoing catalyst compositions may be promoted with a normally non-reducible metal oxide from the group consisting of oxides of chromium, aluminum, iron, calcium, magnesium, manganese and the rare earths to improve the activity of the principal catalyst. Mixed catalysts may conveniently be prepared by igniting and oxidizing mixtures of the corresponding metal nitrate or carbonate salts.

A preferred group of catalysts for this reaction are the mixed nickel, copper and chromium oxide catalysts. Catalysts of this type will consist of 44 to 94 atom percent nickel, 5 to 55 atom percent copper and 1 to 5 atom percent chromium. A specific preferred catalyst composition within these ranges consists of 75% NiO, 22% CuO and 3% $Cr_2O_3$.

When oxides of copper, nickel and cobalt are employed as the catalysts, these oxides will generally be reduced to metal or to lower oxides by the hydrogen present during the reaction. Alternatively, however, such oxides may be prereduced by passing a stream of hydrogen over the oxide composition while heating it to a temperature of 200–400° C. Under such circumstances, care should be exercised to maintain the reduced catalyst in a non-oxidizing environment until the reaction is started up.

The various catalyst compositions may be carried on an inert support such as silica, Filtros, and alumina. Such catalysts, however, may be employed either with or without a support for use in a batch process or on a fixed bed continuous flow system. In conducting the reaction in a batch or non-continuous method, the amount of catalyst employed will conveniently be between about 5% to about 20% by weight based on the weight of the feed composition.

In conducting the present reaction, the non-gaseous feed materials are introduced into a suitable reaction vessel, such as an autoclave. The catalyst is then added in either an oxidized or reduced state. If in the latter condition, a non-oxidizing environment is preferably maintained, such as with hydrogen, nitrogen, etc., to prevent oxidation of the catalyst. Hydrogen is then generally used to sweep out the reaction zone and thereafter the vessel is charged with hydrogen to a pressure of at least 10 atmospheres or more. If desired, water and/or ammonia may also be added to the reactants to promote the reaction. The presence of ammonia is particularly valuable for promoting an improved yield of the desired N-alkylpiperazine. A molar proportion of 1 to 3 moles of ammonia in relation to the moles of compound in the feed is generally sufficient to provide the indicated advantages. Thereafter, the sealed reaction vessel is heated to about 240°–250° C. and a pressure of 100 to 200 atmospheres and these conditions are maintained until the reaction is complete.

The following examples illustrate the practice of this invention:

*Example I*

122 g. monoethanolamine, 100 g. water and 20 g. of a catalyst prepared by reducing in a stream of hydrogen, a mixture of oxides of nickel, copper and chromium containing 60.7% Ni, 12.2% Cu and 1.37% Cr, obtained by decomposing the co-precipitated carbonates at 240° C., were placed in a 1400 ml. stainless steel autoclave bomb which was then closed and purged with hydrogen. 186 g. anhydrous methylamine was introduced under pressure and the total pressure on the bomb was brought to 500 p.s.i.g. with hydrogen. The bomb was heated and agitated for 70 minutes at 240° C., then cooled and opened. Fractional distillation of the cooled reaction product gave 29% of the theoretical yield of N-methylpiperazine, 14% of N,N'-dimethylpiperazine, 7% of N-methylethylenediamine, and 16% of N,N'-dimethylethylenediamine.

*Example II*

Two moles of monoethanolamine, 3 moles of methanol and 2 moles of ammonia were subjected to a reaction under the same conditions and with the same catalyst as described in Example I. This reaction resulted in a substantial yield of N-methylpiperazine.

*Example III*

Two moles of monoethanolamine, three moles of methanol, and .574 mole of 20% aqueous methylamine were subjected to a reaction as described in Example I above. The products included a 22% yield of N-methylpiperazine, an 8% yield of piperazine, and a 4% yield of N,N'-dimethylpiperazine.

*Example IV*

20 g. of a catalyst analyzing 51.2% Ni, 17.1% Cu and 1.3% Cr, prepared from the corresponding nitrates by coprecipitation with ammonium carbonate, calcination to the oxides and partial reduction (61% complete) to the metals, was used in a reaction as above between 2 mols aminoethylethanolamine and 3.65 moles monomethylamine in the presence of 50 g. water, for two hours at 240° C. Distillation and vapor chromatographic analysis of the products revealed a 22.5% yield of piperazine, 18.2% of N-methylpiperazine, and 1.7% of N,N'-dimethylpiperazine, at 87.5% conversion of aminoethylethanolamine.

*Example V*

Two moles of ethylenediamine and two moles of methanol were subjected to a reaction at 250° C. for three hours in the presence of 100 g. water and 20 g. nickel-copper-chromia catalysts as described in Example I above. The reaction products included a 22% yield of N-methylpiperazine, 2% of N,N'-dimethylpiperazine, and 4% of piperazine.

*Example VI*

Two moles of monoethanolamine and two moles of dimethylamine (as a 25% aqueous solution) were subjected to a reaction at 250° C. for one hour in the presence of a nickel-copper-chromia catalyst as described in Example I above. The reaction products included a 14% yield of N-methylpiperazine, 11% of N,N'-dimethylpiperazine and 4% of piperazine.

*Example VII*

Two moles of monoethanolamine and 1.7 moles of trimethylamine were subjected to a reaction at 250° C. for one hour in the presence of 50 g. water and 20 g. of a nickel-copper-chromia catalyst as described in Example I above. The reaction products included a substantial yield of N-methylpiperazine together with some N,N'-dimethylpiperazine and piperazine.

Obviously, many modifications and variations of the invention as hereinbefore set forth may be made without departing from the spirit and scope thereof and therefore only such limitations should be imposed as are indicated in the appended claims.

I claim:

1. A process for preparing an N-alkyl-substituted piperazine which comprises reacting a compound, represented by the formula:

(1) 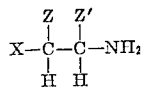

in which Z and Z' are selected from the group consisting of hydrogen and the lower alkyl radicals and X represents a radical selected from the group consisting of OH, NH₂, and

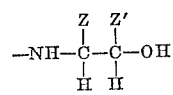

in which Z and Z' have the values noted above, with an alkanol represented by the formula ROH in which R is an alkyl radical, and reacting said compound and said reagent at a temperature in the range of 150° to about 400° C. and a pressure from about 30 to about 400 atmospheres in the presence of hydrogen and a hydrogenation catalyst selected from the group consisting of the metals and oxides of copper, nickel and cobalt and mixtures thereof.

2. A process according to claim 1 in which the pressure of said hydrogen amounts to at least 10 atmospheres.

3. A process according to claim 1 in which said catalyst is promoted with a minor amount of a metal oxide from the group consisting of oxides of chromium, aluminum, iron, calcium, magnesium, manganese and the rare earth metal oxides.

4. A process according to claim 1 in which said catalyst consists of about 60.7 atom percent nickel, 12.2 atom percent copper and 1.4 atom percent chromium.

5. A process for preparing an N-alkyl substituted piperazine which comprises reacting monoethanolamine with an alkanol in the presence of hydrogen and a hydrogenation catalyst selected from the group consisting of the metals and oxides of copper, nickel and cobalt and mixtures thereof at a temperature from about 150 to 400° C. and at a superatmospheric pressure in the range of 30–400 atmospheres.

6. A process for preparing N-methylpiperazine which comprises reacting ethylenediamine with methanol in the presence of hydrogen and a hydrogenation catalyst selected from the group consisting of the metals and oxides of copper, nickel and cobalt and mixtures thereof at a temperature from about 150° C. to 400° C. and at a superatmospheric pressure in the range of 30–400 atmospheres.

(References on following page)

References Cited in the file of this patent

UNITED STATES PATENTS

| | | |
|---|---|---|
| 2,525,223 | Howard | Oct. 10, 1950 |
| 2,754,330 | Schreyer | July 10, 1956 |

FOREIGN PATENTS

| | | |
|---|---|---|
| 436,414 | Great Britain | Oct. 10, 1935 |

OTHER REFERENCES

Ishiguro: J. Pharm. Soc. (Japan), vol. 75, pages 1318–1321 (1955).

Ishiguro: J. Pharm. Soc. (Japan), vol. 77, pages 1051–1054 (1957).